Dec. 6, 1932.  O. R. BRINEY  1,890,146
MACHINING APPARATUS
Filed July 19, 1927    3 Sheets-Sheet 1
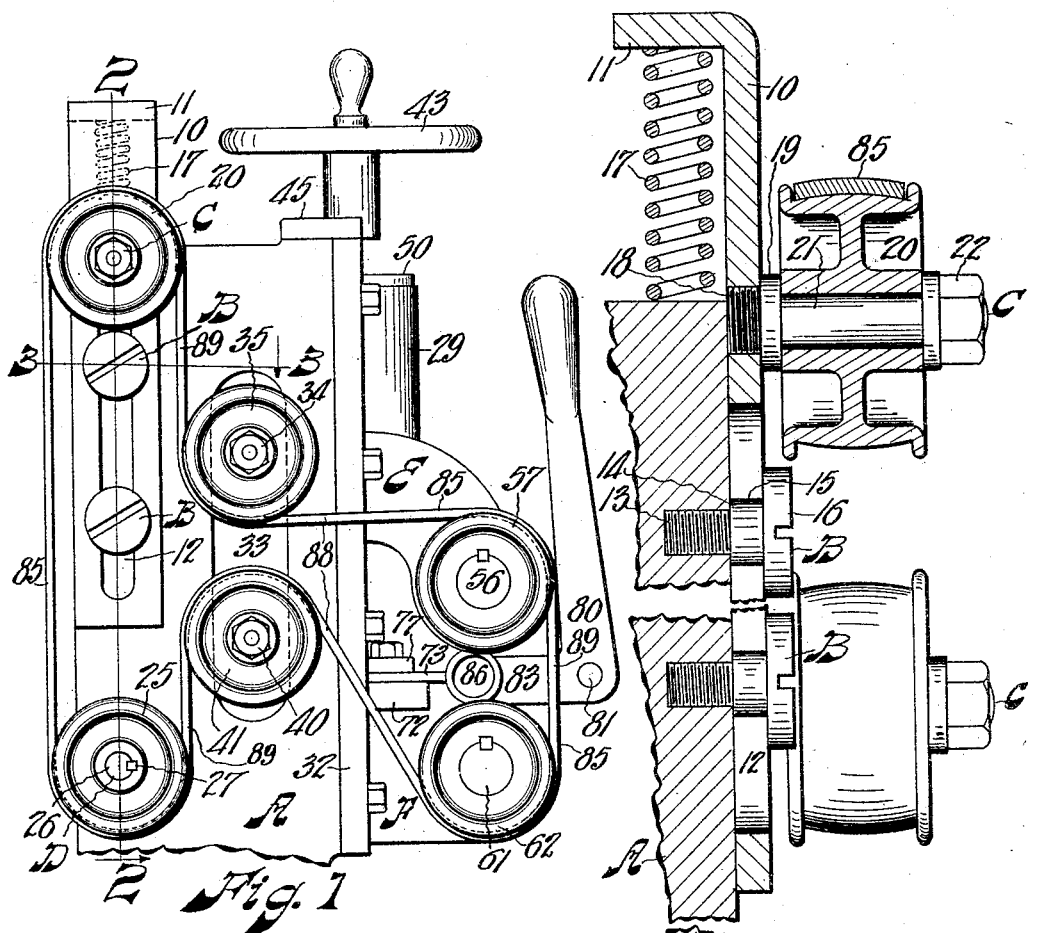
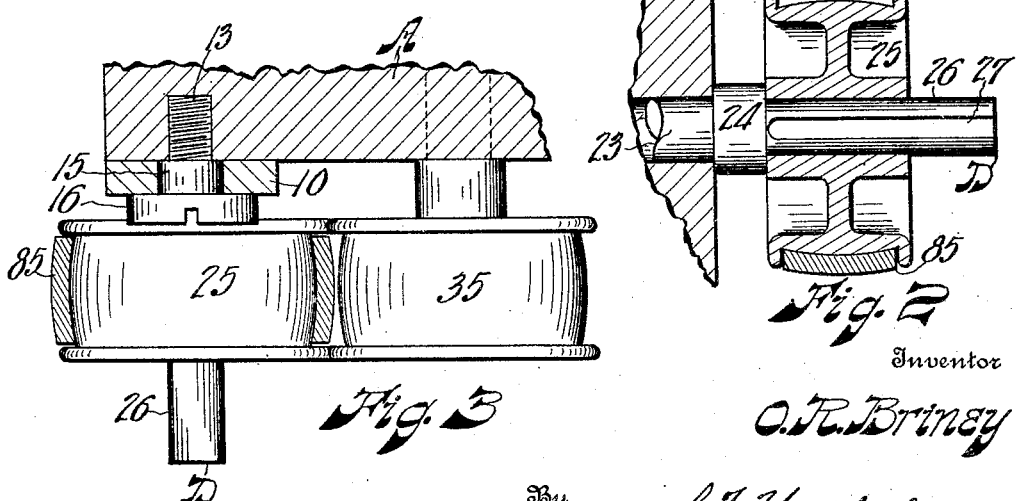
Inventor
O. R. Briney
By C. F. Heinkel, Attorney Dec. 6, 1932.    O. R. BRINEY    1,890,146
MACHINING APPARATUS
Filed July 19, 1927    3 Sheets-Sheet 2
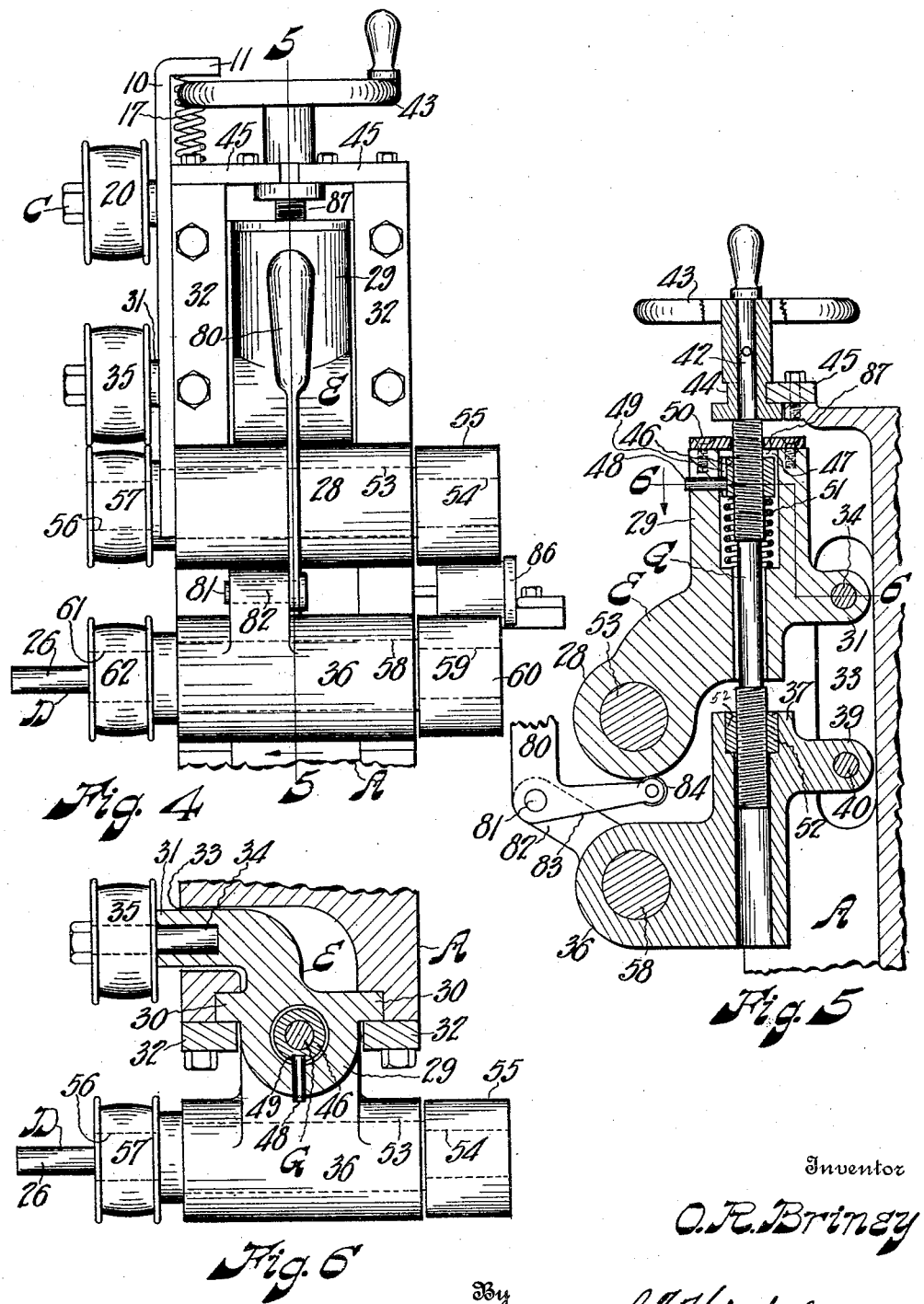

Dec. 6, 1932.   O. R. BRINEY   1,890,146
MACHINING APPARATUS
Filed July 19, 1927   3 Sheets-Sheet 3
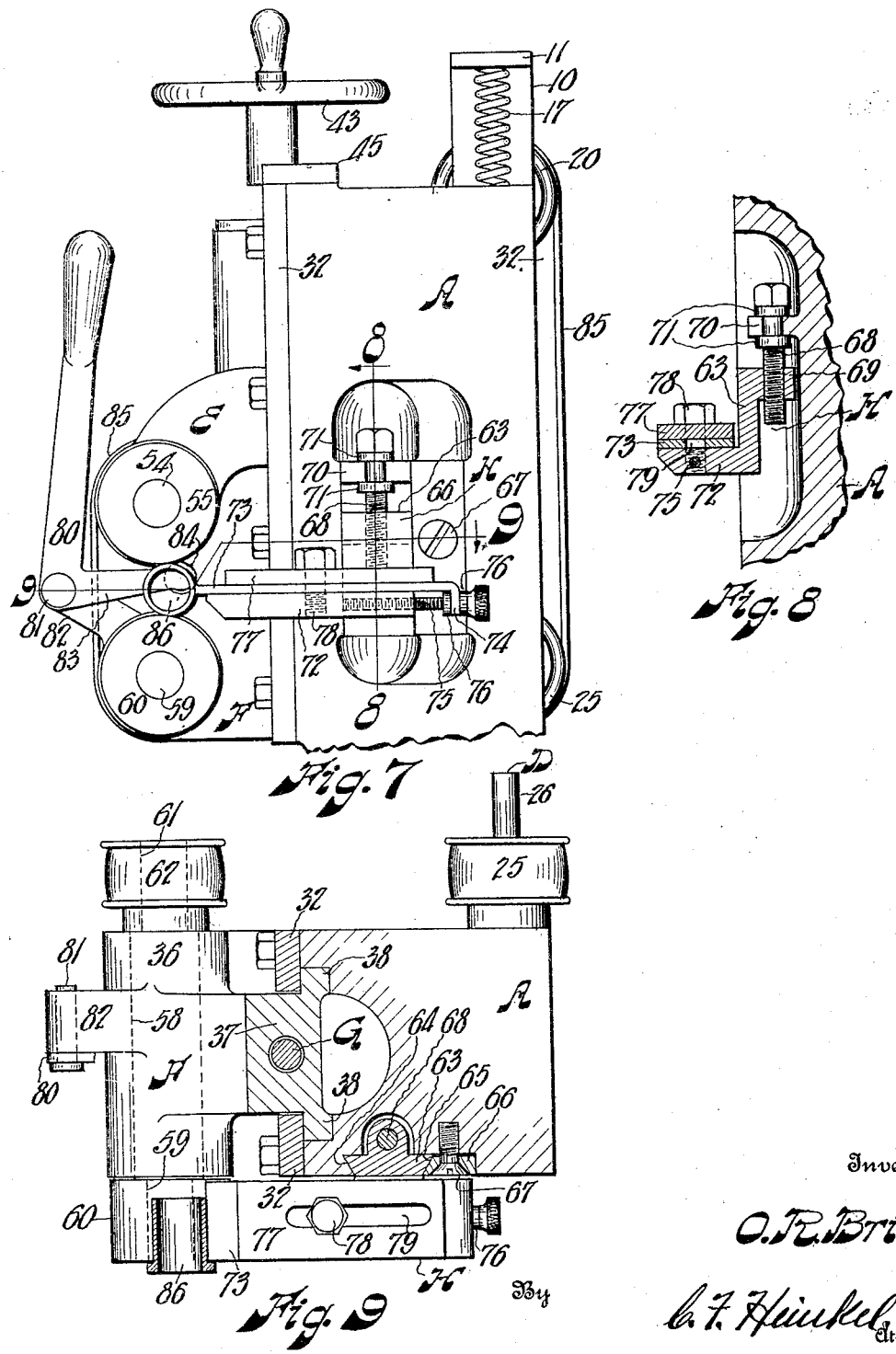

Patented Dec. 6, 1932

1,890,146

UNITED STATES PATENT OFFICE

OTTIS R. BRINEY, OF PONTIAC, MICHIGAN

MACHINING APPARATUS

Application filed July 19, 1927. Serial No. 206,873.

My invention relates to apparatuses for machining articles, particularly for machining cylindrical articles, and more particularly for machining internal surfaces of tubular articles.

One of the objects of my invention is to provide a simple, inexpensive, easily operable, and efficient means for:—holding articles while machining operations are being performed thereon; holding variously sized articles while machining operations are being performed thereon without requiring any changes in the apparatus to adapt the same to variously sized articles; rotating the articles against an abutment surface which is normally stationary but is adjustable toward and/or away from and/or laterally of the articles so that the articles can be brought into various positions in relation to the operating tool or to other parts of the apparatus and/or to the means which rotate the articles; rotating article rotating rollers in unison and thereby rotate the articles; automatically keeping the rollers moving in unison; moving the rollers laterally of each other to cooperate with the normally stationary abutment member to accommodate variously sized articles; and moving the rollers toward and away from each other by a screw means to bodily adjust the rollers into various positions to accommodate variously sized articles and by a lever means to quickly release the articles from the holding means. Other objects will appear, or become apparent or obvious, or will suggest themselves, during the description of the apparatus shown in the accompanying drawings.

In machining operations it is advantageous that articles are held properly in an apparatus while the machining operation is being performed and that the apparatus is capable of holding variously sized articles. My invention aims to attain the holding of the articles in an effective and efficient and economical manner, to permit an operator to change from one size of article to a different size of article without changing the apparatus, and to permit an operator to insert the articles into the apparatus and to remove the same from the apparatus with a minimum expenditure of time and effort.

In order to illustrate my invention, I have embodied the same in a certain apparatus shown in the accompanying drawings; I am aware, however, that my invention can be embodied in apparatuses other than the one shown in the drawings.

In the accompanying drawings:—

Fig. 1 is a rear end elevation of a machining apparatus embodying the features of my invention and shows the pulley and idler and belt arrangement of this particular apparatus as well as relations between other elements of the apparatus.

Fig. 2 is a section, on a larger scale, taken in a vertical plane indicated by the line 2—2 in Fig. 1, and shows more clearly the mounting of the fixed idler and the movable bracket and the idler thereon.

Fig. 3 is a section of a portion of the apparatus, on a larger scale, taken in a horizontal plane indicated by the line 3—3 in Fig. 1, and shows more clearly the mounting of the movable bracket and the retaining screws for the same.

Fig. 4 is a side elevation of the apparatus and shows more clearly the relations of the slidable heads and the rollers and the pulleys and idlers.

Fig. 5 is a section of a portion of the apparatus taken in a horizontal plane indicated by the line 5—5 in Fig. 4, and shows more clearly the relations of the adjusting screw and the heads and the idlers movable with the heads.

Fig. 6 is a section taken in a horizontal plane indicated by the line 6—6 in Fig. 4 and shows more clearly the relations of the heads and the headstock and the adjusting screw for the heads and the studs for the idlers movable with the heads.

Fig. 7 is a front elevation of the apparatus and shows the tool end of the same and the relations of the rollers and the flat abutment means to a bushing and the adjusting means for the flat abutment.

Fig. 8 is a sectional view of a portion of the apparatus, the section is taken in a vertical plane indicated by the line 8—8 in Fig. 7 and shows more clearly the vertical arrangement of the adjusting means for the flat abutment.

Fig. 9 is a section taken in a horizontal plane indicated by the line 9—9 in Fig. 7 and shows more clearly the horizontal arrangement of the adjusting means for the flat abutment.

Similar reference characters refer to similar parts throughout the views.

Referring now particularly and specifically to the particular structure and arrangement of elements of the apparatus shown in the accompanying drawings without limiting myself thereby:—

The base element A, which may be a headstock, may be made of any suitable material and may have any suitable form; the bottom portion thereof, broken away, may be made suitable for attachment to or integral with a machine or other base.

The bracket 10 is mounted to slide longitudinally on the rear end of the element A and has the flange 11 extending angularly from the main body portion thereof and also has the slot 12 through this body portion and is retained against this rear end by two spaced stud elements B each of which has the end 13 threaded into the element A, the shoulder 14 abutting the element A to fix the element B in position, the body portion 15 extending through the slot 12 to guide the bracket in its longitudinal movement, and the head 16 to retain the bracket against the element A.

The spring 17 is interposed between the upper end of the element A and the inner face of the flange 11 and is normally under compression so as to tend to move the bracket longitudinally upwardly.

The stud element C has the end 18 threaded into the bracket 10, the collar 19 abutting the bracket to fix the element C in position, and spacing the movable idler 20, the journal portion 21 for the movable idler 20, and the thread and nut means 22 to retain the idler 20 on the element C.

The shaft D has the end 23 journaled in the element A, the collar 24 spacing the positionally stationary pulley 25, and the portion 26 having the keyway 27. The pulley 25 is keyed to the portion 26 and rotates with the shaft and a pulley or motor or other driving means (not shown in the drawings) is mounted on the outer end of the portion 26 to rotate the shaft D.

The head E has the bosses 28 and 29, the bearing flanges 30, and the boss 31.

The bearing flanges 30 fit into a guide way which extends longitudinally of the entire length of the element A. The plates 32 retain the flanges 30, and consequently the head E, in position traversely of the element A but permit the head to slide longitudinally on and in relation to the element A as is usual in such slide mechanisms.

The boss 31 extends from the head E and out of the element A through the slot 33. The stud 34 has one end thereof driven into the end of the boss 31 and the idler 35 is journaled on the other end thereof.

The head F has the bosses 36 and 37, the bearing flanges 38 similar to the previously mentioned flanges 30, and the boss 39.

The bearing flanges 38 fit into the previously mentioned guide way as do the flanges 30 and are retained therein by the previously mentioned plates 32 and permit the head F to slide longitudinally on and in relation to the element A similar to the head E so that the heads E and F can be moved longitudinally of the element A.

The boss 39 extends from the head F and out of the element A through the previously mentioned slot 33. The stud 40 has one end thereof driven into the boss 39 and the idler 41 is journaled on the other end thereof.

The screw G extends longitudinally through both of the heads and has a right hand and a left hand thread. The end 42 is reduced diametrically and the hand wheel 43 is secured to this reduced end to rotate the screw thereby. The hub portion of the hand wheel has the groove 44 and the plates 45 are secured to the upper end of the element A and extend into the groove 44 and thereby hold the screw longitudinally in a fixed relation to the element A so that the screw itself can not move longitudinally although it can rotate in the plates 45 and can be rotated by means of the hand wheel.

The nut 46 is threaded to one of the threaded portions of the screw G and is located in the counterbore 47 in the boss 29 but is not confined laterally by the walls of the counterbore so that the nut can move longitudinally in the counterbore. The nut 46 is prevented from rotation in the counterbore by the pin 48 driven into the boss 29 and extending into the keyway 49 in the nut. The plate 50 closes the outer end of the counterbore.

The spring 51, normally under compression, is interposed between the inner end of the nut 46 and the bottom of the counterbore.

The nut 52 is threaded to the other threaded portion of the screw G and is driven tightly into a counterbore in the boss 37 so that the same is fixed therein against rotation as well as against longitudinal movement thereof.

With this screw and slide arangement, the heads can be moved toward and away from each other as the hand wheel is rotated either right or left handedly.

The shaft 53 is journaled in the boss 28 and has the diametrically reduced end 54 to which the abutment roller 55 is secured and rotates with it and also has the diametrically reduced end 56 to which the pulley 57 is secured and rotates with it.

The shaft 58 is journaled in the boss 36 and has the diametrically reduced end 59 to which the abutment roller 60 is secured and rotates with it and also has the diametrically reduced end 61 to which the pulley 62 is secured and rotates with it.

The cross head H has the vertical slide portion 63 having the angular side face 64 abutting a corresponding face in the element A and the angular side face 65 abutting a corresponding face on the gib 66 which is mounted in a corresponding groove in the element A and is adapted to retain the cross head H in position laterally and to lock the same into position when so desired by means of the screw 67.

The screw 68 is threaded into the flange 69 of the cross head and is journaled in the ear 70 of the element A and is held against longitudinal movement in the element A by the collars 71.

The tongue 72 extends from the portion 63 toward the rollers and carries the flat abutment element 73 which has the flange 74 in which the screw 75 is journaled and held against longitudinal movement in relation to the abutment element 73 by the collars 76. The screw 75 is threaded into the tongue 72; therefore, the element 73 moves longitudinally toward and away from the abutment rollers as the screw 75 is rotated right or left handedly since the flange 74 of the element 73 is located between the collars 76 and the element 73 must move with the collars as the screw is screwed inward or outward of the tongue 72.

The plate 77 lays on the top of the element 73 and clamps the same into adjusted position by means of the screw 78 which is threaded into the tongue 72 and extends through the slot 79 in the element 73 which slot is elongated so as to permit the element 73 to move longitudinally to adjust the same to variously sized articles and to take up wear on the front end of the element 73.

The lever 80 is fulcrumed on the pin 81 fixed in the boss 82 and has the arm 83 extending inwardly between the bosses 28 and 36 and carries the roller 84 which abuts the underside of the boss 28.

The belt 85 extends over all of the pulleys and idlers and is an endless belt in the present instance, as seen in Fig. 1.

As to the operation of the apparatus shown and described:—

The spring 17 normally tends to move the bracket 10 and the idler 20 upwardly and thereby keeps the belt tight and takes up the stretching of the belt as well as other conditions which affect the belt and tends to keep the belt in working or operating contact with the pulleys and idlers.

A power source rotates the shaft D and the pulley 25 thereon and thereby moves the belt which movement also rotates the idlers 20 and 35 and 41 as well as the pulleys 57 and 62.

The rotation of the pulleys 57 and 62 rotates the shafts 53 and 58 and the abutment rollers 55 and 60 thereon in the same rotative direction. The rotation of these rollers rotates the article, the cylindrical bushing 86 in the present instance, so that a machining tool can operate on the rotating article, either on the inner or on the end surface thereof, when the tool is brought into operative position on the article. No tool means is shown in the drawings since any of the well known tool means or any special tool means can be used in connection with the apparatus.

The flat abutment 73 abuts the outer peripheral surface of the bushing 86 from one side and parallel with or in a plane of the longitudinal axis of the bushing and the rollers 55 and 60 abut the same surface in substantially the same manner from two other sides so that a three point bearing is established which holds the bushing in position and the bushing is rotated by the outer peripheral surface thereof so that the inner surface or an end surface thereof will be machined true with this outer surface.

When the handle end of the lever 80 is moved outwardly, away from the apparatus, the roller 84 is moved upwardly and moves the head E upwardly against the spring 51 and thereby separates the abutment rollers and releases the bushing so that the same can be removed easily and quickly from the apparatus and replaced by another one in the same manner.

The spring 51 normally tends to move the head E toward the head F when the lever 80 is released so that the articles are always held in position with the force residing in the spring 51 so that the articles are not deformed by clamping or similar means.

The flat abutment 73 can be adjusted toward and away from the articles by manipulating the screw 75 so that the longitudinal axis of the article can be moved toward and away from the plane of the centers of the rollers 55 and 60 and thereby permit the longitudinal axis of the articles to be adjusted laterally of the longitudinal axes of the rollers so that the position of the articles can be varied laterally in relation to the rollers either bodily or as to the centers thereof.

The heads E and F can be moved toward and away from each other, due to the right and left hand threads thereon, by rotating the screw G. Such rotation of the screw, in one direction, moves the head F positively since the nut 52 is fixed in the head F but the head E is moved positively only until the rollers 55 and 60 abut the bushing 86 when the same is abutted on the abutment 73 at which stage the spring 51 is compressed when the screw is rotated further in the same direction and this compression can be carried to any desired degree so that the bushing can be contacted by the rollers with any desired pressure within the capacity of the spring.

This head adjusting feature and the longitudinal adjustability of the abutment 73 permits articles of various sizes to be handled by the apparatus.

Since the spring 51 is never compressed so that the coils thereof touch each other and there always is a space between the plate 50 and the end of the nut 46, the lever 80 can raise the head E either the full distance of this space (limited by the plate 50) or any portion thereof and thereby release the articles without manipulating the screw so that the normal position of the head F and the normal tension of the spring 51 to move the head E are not changed when articles are repeatedly taken out of or placed into the apparatus; therefore, any number of articles can be held in the apparatus with the same pressure.

The spring 51 moves the head E toward and into contact with the articles when the lever 80 is released.

Manipulation of the screw 68 moves the element H, and the abutment 73 thereon, vertically so that the abutment 73 can be brought into contact with the bushing 86 in various positional relations thereof to the bushing.

Since the idlers 35 and 41 move with the heads E and F, the tension of the belt is not changed when the heads are moved since the heads slide parallel with the bracket 10; therefore, when the idlers 35 and 41 are moved, the pulleys 57 and 62 move the same distance in the same direction so that the length of the horizontal portions 88 do not change when the heads are moved and the lengths of some vertical portion 89 is lengthened or shortened while another portion 89 is shortened or lengthened so that the combined length is always the same; therefore, the movement of the heads does not affect the length of the belt nor the operating contact thereof on the pulleys and idlers.

In addition to this belt arrangement, the spring 17 takes up whatever slack there may be in the belt and insures a uniform belt contact on the pulleys and idlers at all times.

I am aware that changes can be made in the structure as well as in the arrangement of the elements shown and described within the scope of the appended claims; therefore, without limiting myself to the precise structure and arrangement of elements as shown and described, nor to the particular application of my invention as shown and described and previously mentioned,

I claim:—

1. An apparatus of the character described including a pair of heads having article contacting members thereon, one of said heads being movable in relation to the other one of said heads, moving means normally tending to automatically move said movable head and the contacting member thereon in an article contacting direction, and a selectively operative lever means adapted to move said movable head in an article releasing direction against the action of said automatically moving means.

2. An apparatus of the character described including a pair of heads movable toward and away from each other and having article contacting members thereon, means for moving said heads into various positions in relation to each other, moving means normally tending to automatically move one of said heads toward the other one of said heads when said one head is moved into any of the positions thereof, and lever means adapted to move said one head away from said other head against the action of said automatically moving means.

3. A machining apparatus including a base having a guide way, an abutment for sidewise contact by an article to be machined mounted on said base, a pair of heads guided in said guide way for movement thereof toward and away from said abutment for adaptation of the apparatus to variously sized articles, a rotating article locating member carried by each one of said heads sidewise adjacent to said abutment and both tending to locate the article in a definite position and to rotate the same against said abutment, and means to move one of said heads to release the article from the apparatus.

4. A machining apparatus including a base having a guide way, an abutment for sidewise contact by an article to be machined mounted on said base, a pair of relatively movable heads guided in said guide way, a rotating article contact member carried by each one of said heads and adapted to locate the article in a definite position and to rotate the same against said abutment; one of said heads being mounted to move resiliently and being individually movable to release the article from the apparatus.

5. A machining apparatus including a base having a guide way, an abutment for sidewise contact by an article to be machined mounted on said base, a pair of movable heads guided in said guide way, a rotating article contact member carried by each one of said heads and adapted to locate the article in a definite position and to rotate the same against said abutment, a right and left hand threaded screw mounted in said base, one of said heads being in direct threaded relation with one of the threads on said screw, and the other one of said heads being in resilient relation with the other one of the threads on said screw.

6. An apparatus of the character described including a pair of heads and article locating rollers thereon movable toward and away from each other to locate articles, an operable member extending through both of said heads and having means to engage and to move the same into various positions relative to each other to adapt said rollers thereon for various sized articles, one of said heads being individually movable in relation to said operable member to permit removal and insertion of articles from and into the apparatus, resilient means between said operable member and said one head to normally retain the roller on said one head in contact with an article in the apparatus, and a lever means to move said one head against the action of said resilient means to permit insertion of an article into the apparatus and to release the article for removal thereof from the apparatus.

7. An apparatus of the character described including an article releasing and locating and rotating means composed of three nonmachining article abutting elements, two of said elements being positionally fixed, one of said two elements being rotatable to rotate the article, and the third one of said elements being positionally movable to release and to locate the article from and in the apparatus and rotatable to rotate the article conjointly with said one of the two elements.

8. An apparatus of the character described including an article releasing and locating and rotating means composed of three nonmachining co-operating article abutting elements, means on one of said elements to positionally fix the same and to positionally move the same for co-operation with the other abutting elements, the other two of said elements mounted for universally adjustable relation toward and away from each other for co-operation with said one element, means to positionally fix the positionally fixable elements and to rotate the rotatable elements, and means to positionally move one of said two elements to release articles from said means and to locate articles between the abutting elements and to complete the co-operation of said abutting elements.

9. An apparatus of the character described including an article locating and rotating means composed of a stationary member having abutment surface for contact with outer surface of cylindrical articles, a pair of rotatable nonmachining members each having abutment surface for contact with the outer surface of articles, means for moving said three members to adapt the means for differently sized articles, means for moving one of said pair of members to move the articles toward said stationary member, and means to rotate both of said rotatable members to rotate the articles.

10. An apparatus of the character described including an article locating and rotating means composed of an adjustable positionally fixable member for contact with outer surface of cylindrical articles, means to move said member into various relations to other members of said means, a pair of rotatable nonmachining members each for contact with the outer surface of the articles and located at opposite sides of said fixable member, means to move said pair of members into various distance relations to each other and to said fixable member, and means to rotate both of said rotatable members.

11. An apparatus of the character described including an article locating and releasing and rotating means composed of an adjustable positionally fixable member for contact with outer surface of cylindrical articles, means to move said member into various relations to other members of said means, a pair of rotatable nonmachining members each for contact with the outer surface of the articles and located at opposite sides of said fixable member, means to move said pair of members into various distance relations to each other and to said fixable member, means to individually move one of said rotatable members to locate articles in said means and to move the same out of normal article contacting position to release articles in said means and to permit articles to be easily inserted into said means, and means to rotate both of said rotatable members.

12. An apparatus of the character described including a pair of relatively movable heads and pulley and idler means and a belt-like means over the pulley and idler means; one of said pulleys being rotatable on one of said heads, another one of said pulleys being rotatable on the other one of said heads; an article abutment element on the apparatus, an article contacting roller on each of said heads and rotated by said pulley thereon and locating an article in the apparatus and against said abutment element, means for moving one of said heads individually to release the article, and all pulleys and idlers being located so that the tension of the belt-like means is retained when said heads are moved.

13. An apparatus of the character described including a pair of relatively movable heads and pulley and idler means and a belt-like means over the pulley and idler means; one of said pulleys and one of said idlers being rotatable on one of said heads, another one of said pulleys and another one of said idlers being rotatable on the other one of said heads; an article abutment element on the apparatus, an article contacting roller on each of said heads and rotated by said pulley thereon and locating an article in the apparatus and against said abutment element, means for moving one of said heads individually to release the article, all pulleys and idlers being located and arranged so that the belt-like means tends to move said heads toward each other.

14. An apparatus of the character described including a pair of relatively movable heads and pulley and idler means and a belt-like means over the pulley and idler means; one of said pulleys being rotatable on one of said heads, another one of said pulleys being rotatable on the other one of said heads; an article abutment element on the apparatus, an article contacting roller on each of said heads and rotated by said pulley thereon and locating an article in the apparatus and against said abutment element, means for moving one of said heads individually to release the article, all pulleys and idlers being located so that the tension of the belt-like means is retained when said heads are moved and the belt-like means tends to move said heads toward each other.

15. An apparatus of the character described including a pair of relatively movable heads and pulley and idler means and a belt-like means over the pulley and idler means; one of said pulleys being rotatable on one of said heads, another one of said pulleys being rotatable on the other one of said heads; an article abutment element on the apparatus, an article contacting roller on each of said heads and rotated by said pulley thereon and locating an article in the apparatus and against said abutment element, means for adjusting said abutment element in relation to said rollers, means for moving said heads to adjust said rollers in relation to each other and to said abutment element, means for moving one of said heads individually to release the article, and all pulleys and idlers being located so that the tension of the belt-like means is retained when said heads are moved.

16. An apparatus of the character described including a pair of heads mounted to move toward and away from each other to adapt the apparatus for variously sized articles, non-machining rotatable article locating members on said heads and moving therewith, means for simultaneously moving said heads towards and away from each other, and means to quickly move one of said heads individually to release articles from the apparatus and to insert articles into the apparatus.

17. An apparatus of the character described including article abutment means to locate an article in the apparatus, two of said means mounted to move in alinement toward and away from each other and angularly in relation to a third one of said means, and means for quickly moving one of said means individually for removal of articles sidewise from and insertion of articles sidewise into the apparatus.

18. An apparatus of the character described including a pair of heads mounted to move simultaneously in alinement toward and away from each other and uniformly to and from a common axis, rotating article locating members on said heads to move therewith, means for simultaneously and uniformly moving said heads, and means to quickly move one of said heads individually of the other of said heads.

19. An apparatus of the character described including a headstock, an article locating member mounted on said headstock and extending forwardly thereof, a head guided in said headstock to move toward and away from said article locating member at one side thereof and having an article locating member thereon in a definite article locating relation with the first mentioned article locating member, a head guided in said headstock to move toward and away from the first mentioned article locating member at the other side thereof and having an article locating member thereon in article locating relation with the first and second mentioned article locating members, and means to move the second mentioned head toward the first and second mentioned article locating members to confine the article in the apparatus and away from the first mentioned article locating member to release the article.

20. An apparatus of the character described including a headstock, an article locating member mounted on said headstock and extending forwardly thereof, a head guided in said headstock to move toward and away from said article locating member at one side thereof and having an article locating member thereon in a definite article locating relation with the first mentioned article locating member, a head guided in said headstock to move toward and away from the first mentioned article locating member at the other side thereof and having an article locating member thereon in article locating relation with the first and second mentioned article locating members, means to move the second mentioned head toward the first and second mentioned article locating members to confine the article in the apparatus and away from the first mentioned article locating member to release the article, and adjusting means for said article locating members to relate the same according to requirements for different articles.

In testimony of the foregoing I affix my signature.

O. R. BRINEY.